United States Patent
Botwick et al.

(10) Patent No.: US 11,954,088 B2
(45) Date of Patent: Apr. 9, 2024

(54) ALERT FEED AND SUBSCRIPTION MANAGEMENT

(71) Applicant: salesforce.com, inc., San Francisco, CA (US)

(72) Inventors: Nathaniel Botwick, San Francisco, CA (US); Norris Lee, South San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 101 days.

(21) Appl. No.: 17/162,433

(22) Filed: Jan. 29, 2021

(65) Prior Publication Data
US 2022/0012227 A1    Jan. 13, 2022

Related U.S. Application Data

(60) Provisional application No. 63/050,658, filed on Jul. 10, 2020.

(51) Int. Cl.
| | |
|---|---|
| G06F 16/00 | (2019.01) |
| G06F 9/54 | (2006.01) |
| G06F 16/21 | (2019.01) |
| G06F 16/23 | (2019.01) |
| G06F 16/25 | (2019.01) |

(52) U.S. Cl.
CPC .......... G06F 16/2358 (2019.01); G06F 9/542 (2013.01); G06F 16/219 (2019.01); G06F 16/252 (2019.01)

(58) Field of Classification Search
CPC ... G06F 16/2358; G06F 16/219; G06F 16/252

USPC ........................................................ 707/703
See application file for complete search history.

(56) References Cited

U.S. PATENT DOCUMENTS

| | | | |
|---|---|---|---|
| 2013/0007148 A1* | 1/2013 | Olsen | G06Q 50/01 709/206 |
| 2013/0144971 A1* | 6/2013 | Austin-Lane | H04L 51/226 709/217 |

OTHER PUBLICATIONS

International Search Report and Written Opinion of the International Searching Authority directed to related International Patent Application No. PCT/US2021/015849, dated Apr. 13, 2021; 10 pages.

* cited by examiner

*Primary Examiner* — Chelcie L Daye
(74) *Attorney, Agent, or Firm* — Sterne, Kessler, Goldstein & Fox P.L.L.C.

(57) ABSTRACT

Described herein are a system, apparatus, device, method, and/or computer program product embodiments and/or combinations and sub-combinations thereof for managing alerts and subscriptions in a cloud collaborative system. In one embodiment, a modification notice identifying a change to a field of a record is obtained, and the change is compared with a criterion specified in a subscription for a user. If the change satisfies the criterion, an alert is generated based on the modification notice. An alert GUI is transmitted to a user device to display alerts for the user. The user may access an expanded view of the record through the alert in the alert GUI. The user may also publish the alert to a chat session involving other users of the cloud collaborative system.

20 Claims, 11 Drawing Sheets

ALERT FEED AND SUBSCRIPTION MANAGEMENT

CROSS-REFERENCE TO RELATED APPLICATIONS

This application is a non-provisional application of U.S. Provisional Patent Application Ser. No. 63/050,658, entitled: "Alert Feed and Subscription Management," which filed on Jul. 10, 2020. Accordingly, this application claims priority to U.S. Provisional Patent Application Ser. No. 63/050,658 under 35 U.S.C. § 119(e). U.S. Provisional Patent Application Ser. No. 63/050,658 is hereby incorporated by reference in its entirety.

BACKGROUND

In a cloud collaborative environment, multiple users are generating and modifying database records and collaborative documents (e.g., reports). As the number of users increases and as the volume of records and collaborative documents increases, it becomes increasingly difficult for a user to monitor for changes to records and collaborative documents that are of interest to the user. Regardless, the use of cloud collaborative environments remain popular.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for managing alert feeds and subscriptions in a cloud collaborative environment. Specifically, a modification notice is published every time a database table, record, field, and/or collaborative document (e.g., report, lists, etc.) is modified. The modification notice identifies the change to the database table, record, field, and/or collaborative document. Further, each user has one or more subscriptions, and each subscription specifies one or more criteria associated with a database table, record, field, and/or collaborative document (e.g., report, lists, etc.). A modification notice is compared with the subscriptions of a user. If the change identified in the modification notice satisfies the one or more criteria of a subscription, an alert is generated and placed in an alert feed for the user. Accordingly, the alert feed has multiple alerts triggered by the user's multiple subscriptions and the alert feed may be viewed in an alert GUI. This enables the user to easily monitor for changes to database tables, records, fields, and/or collaborative documents of interest, despite the huge volume of data and users associated with the cloud collaborative environment. Additional subscriptions may be suggested to the user based on the user's custom views of documents.

Figure 1:
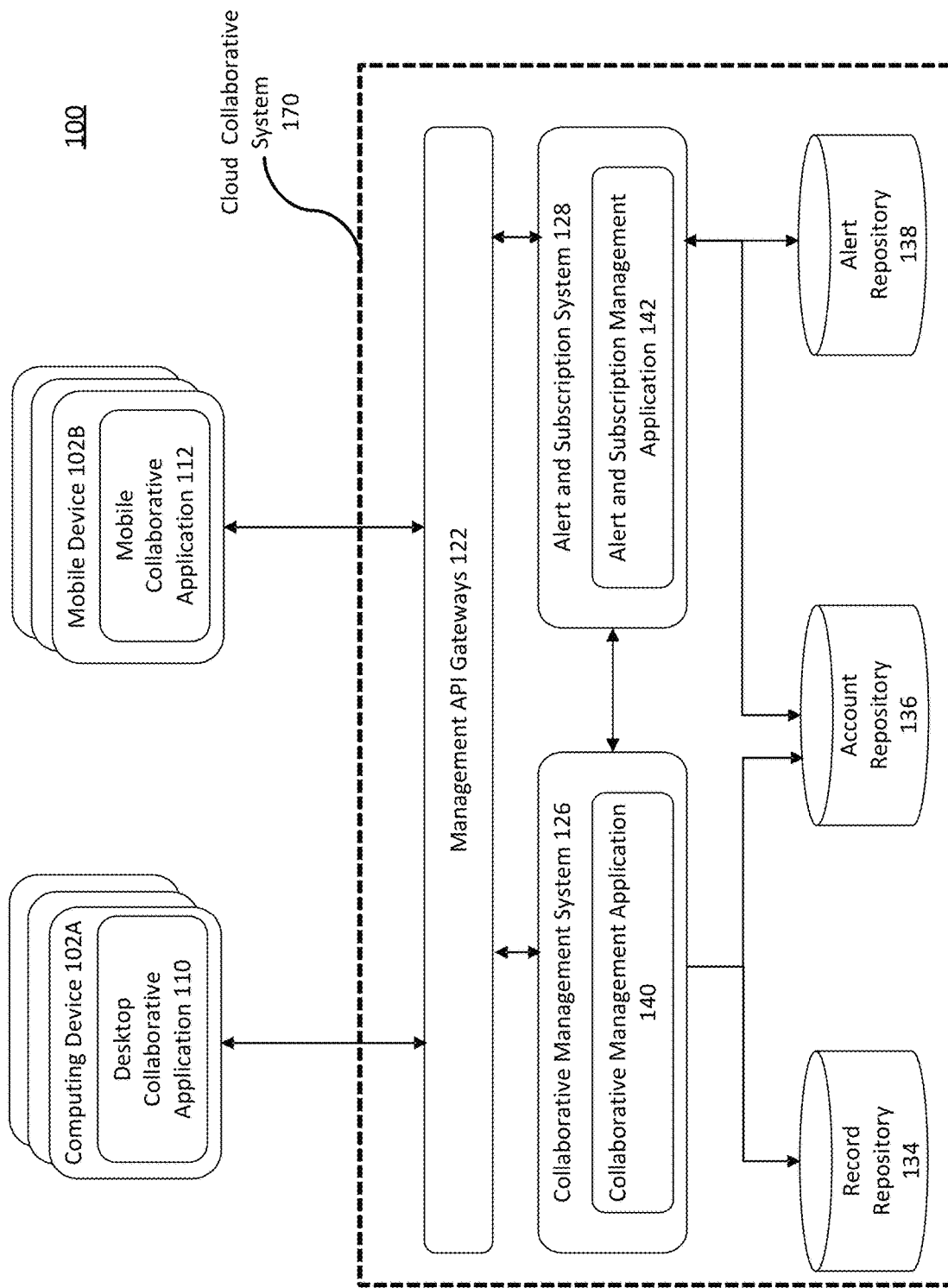
FIG. 1 is a block diagram of a system for managing alert feeds and subscriptions in accordance with one or more embodiments.

FIG. 1 is a block diagram of system 100 for managing alert feeds and subscriptions in a cloud environment in accordance with one or more embodiments. System 100 may include one or more mobile devices 102B, one or more computing devices 102A, where the one or more mobile devices 102B, one or more computing devices 102A may be operatively and/or communicatively coupled to a cloud collaborative system 170. For example, the one or more computing devices 102A, the one or more mobile devices 102B, and/or the cloud collaborative system 170 of the system 100 may all be communicatively and/or operatively coupled together via wired connections, wireless connections, or a combination of wired and wireless connections as part of one or more communications networks.

In one example embodiment, the one or more communications networks may include, without limitation, an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In one embodiment, the one or more computing devices 102A may be generally configured to execute one or more applications, which may include, without limitation, desktop collaborative application 110. For example, the one or more computing devices 102A may be representative of desktop computing devices, server devices, virtual machines executing on desktop computing devices and/or server devices, and/or the like. An example implementation of a computing device 102A is further illustrated and discussed with respect to FIG. 6.

In one embodiment, the one or more mobile devices 102B may be generally configured to execute one or more mobile applications, which may include, without limitation, mobile collaborative application 112. For example, the one or more mobile devices 102B may be representative of mobile phones, personal digital assistants, tablet computing devices, portable media players, and/or the like. An example implementation of a mobile device 102B is further illustrated and discussed with respect to FIG. 5.

In one embodiment, the desktop collaborative application 110 (e.g., a web browser, a native application, etc.) may be configured to visually present (or otherwise display) one or more user interface (UI) views on a display device operatively coupled to the respective computing device 102A. The one or more UI views may be generally configured to allow a user of the desktop collaborative application 110 to manage (e.g., generate, modify, view, etc.) subscriptions and alerts.

In one embodiment, the mobile collaborative application 112 (e.g., a mobile web browser, a native mobile application, etc.) may be configured to visually present (or otherwise display) one or more user interface (UI) views on a screen of the mobile device 102B. The one or more UI views may be generally configured to allow a user of the mobile collaborative application 112 to manage (e.g., generate, modify, view, etc.) subscriptions and alerts.

In one embodiment, the cloud collaborative system 170 may include, without limitation, a management application program interface (API) gateway 122, a collaborative management system 126, an alert and subscription system 128, record repository 134, accounts repository 136, and alert repository 138. All these systems, gateways, and repositories may be communicatively and/or operatively coupled together via one or more wired connections, wireless connections, or a combination of wired and wireless connections as part of one or more communications networks as illustrated in FIG. 1.

In one embodiment, the record repository 134 may be generally configured to store database records and collaborative documents (e.g., reports, lists). As a non-limiting example, the database records may be sales account records. The sales account records may include the name of the sales account, potential sale value, past sale value, target close date, current client, past client, potential client, or the like.

In one embodiment, the account repository 136 and may be generally configured to manage user account information associated with each user of the collaborative management system 126 and alert and subscription system 128. The user account information for each user may include, without limitation, a user identifier (e.g., user's email, unique name, etc.), the full user name (e.g., first name and last name, etc.), user password (e.g., a hashed and salted version of an alphanumeric text, etc.), user image (e.g., an image or reference to a time associated with the user), permission settings, and/or any other information associated with a user.

In one or more embodiments, the user account information for each user also includes the user's current subscriptions and suggested subscriptions. A subscription specifies one or more criteria associated with a database table, record, field, and/or collaborative document (e.g., report, list, etc.). If the criteria is satisfied, an alert is generated and inserted into the user's alert feed. Different users may have different subscriptions and different numbers of subscriptions. Additional details regarding subscriptions and alerts are discussed below.

In one embodiment, the alert repository 138 may be generally configured to store an alert feed for each user. An alert feed stores the alert generated when the one or more criteria associated with the user's subscription are satisfied. Each alert feed may be configured to store a finite number of alerts for the user. When the alert feed is filled to capacity, alerts in the alert feed may be deleted. For example, the older alerts in the alert feed may be deleted before newer alerts. Additional details regarding subscriptions and alerts are discussed below.

In one embodiment, the collaborative management system 126 or alert and subscription system 128 may be generally configured to provide one or more cloud-computing services. The one or more cloud-computing services may include, without limitation, Infrastructure as a Service (IaaS), Software as a Service (SaaS), Platform as a Service (PaaS), Storage as a Service (StaaS), Mobile "backend" as a service (MBaaS), Function as a Service (FaaS), and/or any other cloud computing services. In one embodiment, the one or more cloud-computing services may also be generally implemented by one or more virtual machines executing on one or more server devices.

In one embodiment, the one or more cloud computing services of the collaborative management system 126 may be generally configured to execute one or more distributed applications, which may include, without limitation, collaborative management application 140. Collaborative management application 140 may allow multiple users to collaborate together, in real-time or near real-time, to design, write, implement, edit, and finalize various forms of collaborative content such as, for example, one or more collaborative documents (e.g., reports, lists). One or more of these operations (e.g., design, write, implement, edit, finalize, etc.) may include modifying database tables, fields, and/or collaborative documents (e.g., reports, lists) stored in record repository 134.

In one or more embodiments, the collaborative management application 140 may generally be configured to communicate and operate with desktop collaborative application 110 and mobile collaborative application 112 in order to provide an interface with records repository 134 and account repository 136.

In one or more embodiments, the collaborative management application 140 may publish a modification notice every time a field, record, database table, or collaborative document (e.g., report, list) in the record repository 134 is changed. The modification notice identifies the change to the field, record, database table, or collaborative document.

For example, in the case of a changed field, the modification notice may include the name of the changed field (e.g., "closing date"), the previous and modified values of the field (e.g., "July 1", "August 15"), the identity of the record containing the changed field, other fields from the record, a link to an expanded view of the record, and/or a statement with the change to the field (e.g., "the closing date has changed from July 1 to August 15").

As another example, in the case of a changed collaborative document (e.g., report), the modification notice may include the name of the collaborative document, the modified portion (e.g., sentence, paragraph, image, chart, etc.) of the document, a link to the document, and/or a statement with the change (e.g., "paragraph [0025] of the report was modified", "FIG. 3 of the report was modified").

As yet another example, in the case of a changed database table, the modification notice may include the identity of the table (e.g., "sales account table"), a link to the table, a link to a newly added record to the table, and/or a statement with the change (e.g., "a new record has been added to the sales account table").

In one embodiment, the one or more cloud computing services of the alert and subscription system 128 may be generally configured to execute one or more distributed applications, which may include, without limitation, alert and subscription management application 142. In one or more embodiments, the alert and subscription management application 142 may generally be configured to communicate and operate with desktop collaborative application 110 and mobile collaborative application 112 in order to provide an interface with alert repository 138 and account repository 136.

In one or more embodiments, the alert and system management application 142 is configured to compare the change identified in each modification notice with the one or more criteria of the subscription for a user. If the one or more criteria of a subscription is satisfied, the alert and system management application 142 may generate an alert based on the modification notice and insert the alert in the alert feed for the user. Example criteria include a total cost field of one or more records changing by at least 10%, a closing date of one or more records changing by at least thirty days, a record or field was modified by user John Doe, a record being added to or removed from a database table, a portion (e.g., sentence, paragraph, image, chart) of a report being modified, etc.

In one or more embodiments, some of the content in the alert is extracted from the modification notice that triggered the alert. In one or more embodiments, the alert and subscription management application 142 is also configured to provide the mobile collection application 112 and/or the desktop collaborative application with an alert GUI for displaying the user's alert feed and subscriptions. An example alert GUI is illustrated in FIG. 2A and FIG. 2B.

It may be appreciated that while collaborative management system 126 and alert and subscription system 128 are illustrated as separate systems, these two systems may be combined into a combined system. Moreover, the combined system may then be configured to provide one or more cloud-computing services and execute the one or more distributed applications including, without limitation, the collaborative management application 140 and alert and subscription management application 142.

In one embodiment, the management API gateways 122 may be generally configured to provide one or more APIs to allow one or more applications (e.g., the collaborative management application 140, alert and subscription management application 142, etc.) to communicate with the desktop collaborative application 110 and mobile collaborative application 112. For example, the management API gateways 122 may be configured to manage any incoming requests and provide corresponding responses between the one or more applications and the collaborative management system 126 and/or alert and subscription system 128 in accordance with one or more communication protocols.

Figure 2:
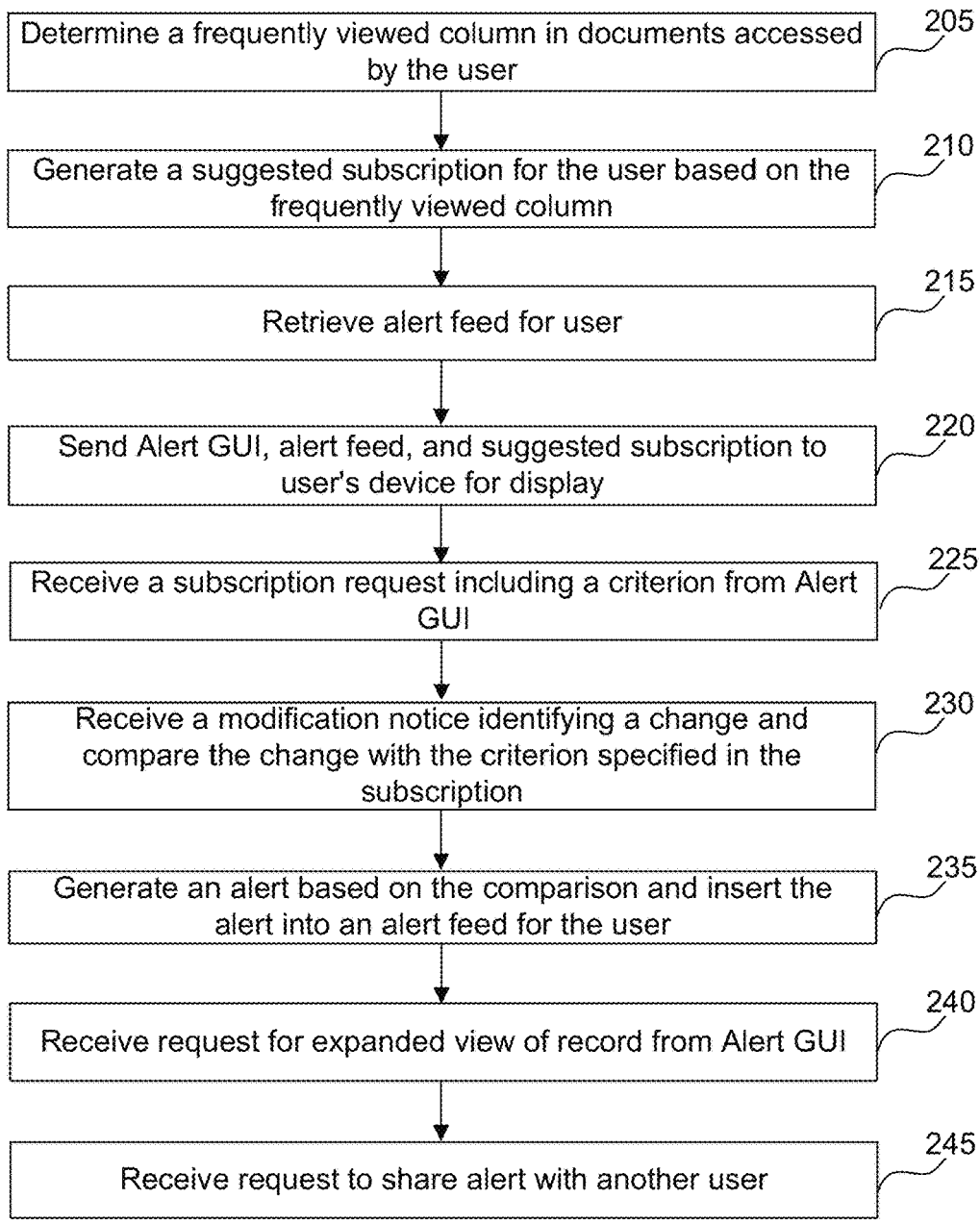
FIG. 2 is a flowchart illustrating a process for managing alert feeds and subscriptions in accordance with one or more embodiments.

FIG. 2 is a flowchart illustrating a process for managing alert feeds and subscriptions, according to some embodiments. Method 200 may be performed by processing logic that may comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein (i.e., some steps are optional). Further, some of the steps may be repeated, performed simultaneously, or in a different order than shown in FIG. 2, as will be understood by a person of ordinary skill in the art.

Method 200 shall be described with reference to FIG. 1. However, method 200 is not limited to that example embodiment.

In operation 205, one or more frequently viewed columns are determined for a user. The one or more frequently viewed columns may be determined by collaborative management application 140. In general, a user may access multiple documents (e.g., reports) and these documents include multiple columns of data. The user may generate a custom view of a document by specifying which columns should be displayed in the document and which columns should be hidden in the document. If the user frequently requests that a column be displayed (e.g., the number or percentage of times the user requests the column to be displayed exceeds a threshold), the column is deemed to be a frequently viewed column. The number or percentage of times the user requests a column to be displayed may be stored and updated in the user's account within account repository 136.

In operation 210, one or more suggested subscriptions are generated for the user based on the one or more frequently viewed columns. The suggested subscriptions may be generated by alert and subscription management application 142. The suggested subscriptions may be stored in the user's account within account repository 136. As discussed above, a subscription specifies one or more criteria associated with a record, field, record, and/or document. If the criteria is satisfied, an alert is generated and inserting into the user's alert feed.

Those skilled in the art, having the benefit of this disclosure, will appreciate that the rows of a grid showing data may be considered records, while the columns of the grid may correspond to fields of the records (or vice versa). Accordingly, a frequently viewed column likely corresponds to a field of interest to the user. The suggested subscription may identify the field of interest and specify at least one criterion based on the type of data in the field of interest. For example, if the field of interest is populated with dollar amounts, the criterion in the suggested subscription may be a change of 10%. If the field of interest is populated with dates, the criterion may be a change of 30 days. If the field of interest gets populated with a flag (e.g., Boolean value), the criterion in the suggested subscription may be the setting or clearing of the flag. If the field of interest is populated with a shipping address, the criterion in the suggested subscription may be any change to the field of interest.

Suggested subscriptions are not limited to fields. For example, if a user frequently accesses a collaborative document (e.g., report) or a database table, the suggested subscription may identify the document or table and the criterion in the suggested subscription may be any change to the document or table.

In operation 215, an alert feed for the user is retrieved from alert repository 138. The alert feed may be retrieved by alert and subscription management application 142. As discussed above, the alert feed stores alerts resulting from the user's subscriptions. The alerts may be stored and displayed chronologically. Each alert feed may be fixed in size, so older alerts in the alert feed may be discarded to make room for newer alerts.

When an alert is associated with a field, the alert may include, for example, the field that triggered the alert, one or more other fields in the same record as the field that triggered the alert, a statement as to what caused the alert and the old and new values of the field (e.g., "The price increased from $10 to $15", "The suspected fraudulent transaction flag was set", "The closing date changed from July 1 to August 15", etc.), and/or a link to an expanded view of the record with the field that triggered the alert.

When an alert is associated with a report, the alert may include, for example, the portion of the report (e.g., sentence, paragraph, etc.) that triggered the alert, a statement as to what caused the alert (e.g., "Paragraph [0025] was modified", etc.), and link to the full report.

When an alert is associated with a table, the alert may include, for example, the identity of the table (e.g., "sales account table"), a link to the table, a link to a newly added record to the table, and/or a statement with the change (e.g., "a new record has been added to the sales account table").

In operation 220, an alert GUI, the alert feed for the user, and the current and/or suggested subscriptions for the user are transmitted to a user's device 102. Both operation 215 and operation 220 may be triggered by the user logging into cloud collaborative system 170 or by the user explicitly requesting to view the alert GUI. The alert GUI, the alert feed, and the suggested and/or current subscriptions may be transmitted by the alert and subscription management application 142.

Figure 3A:
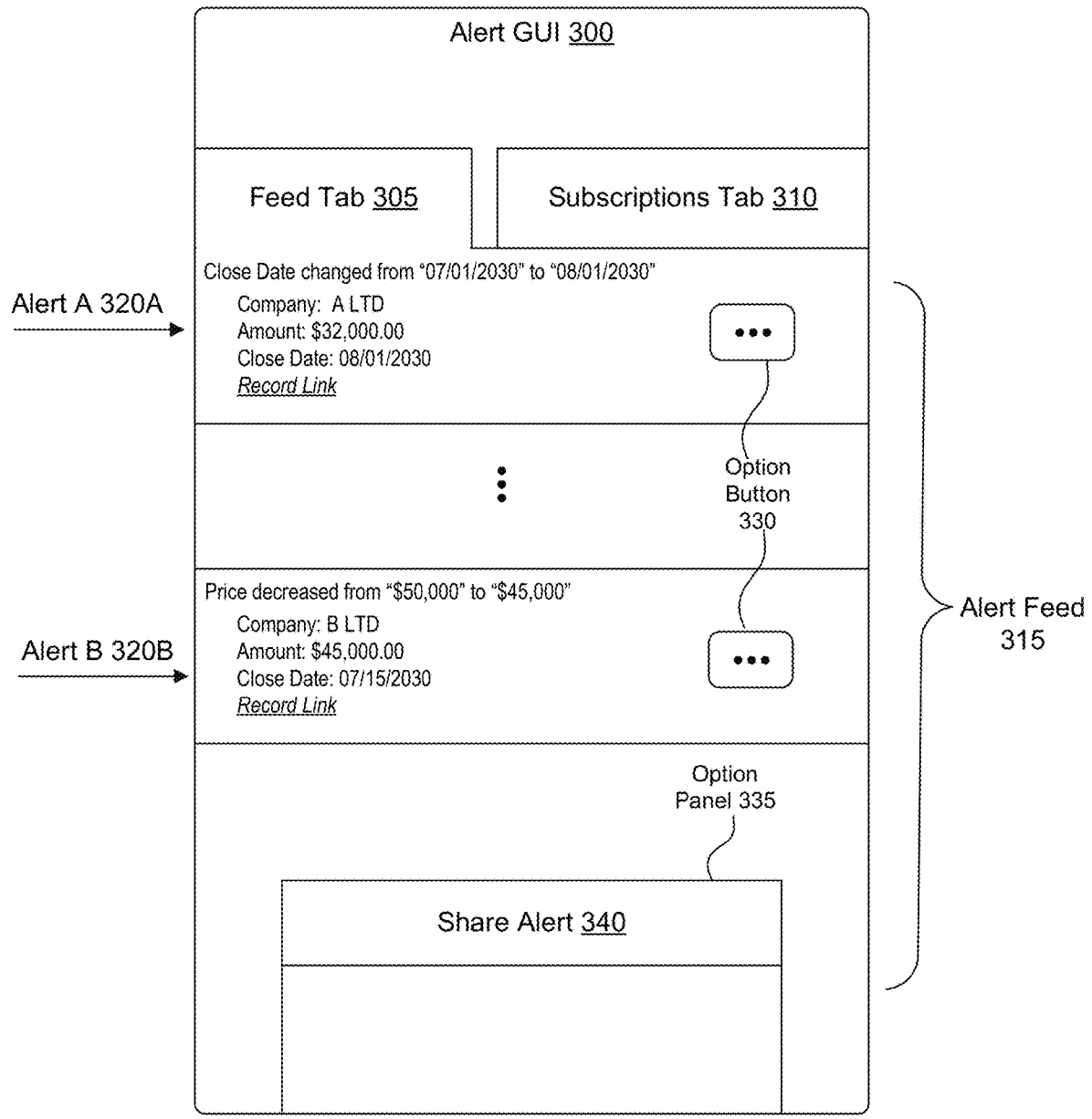
FIGS. 3A-3F illustrate example alert graphical user interfaces (GUI) in accordance with one or more embodiments.

The alert GUI may include a feed component and a subscriptions component. For example, the feed component and the subscriptions component may be GUI tabs. The feed component may be configured to display the alert feed for the user. If the alert feed is long, the feed component may enable vertical scrolling. An example alert GUI with the feed component is shown in FIG. 3A.

Figure 3B:
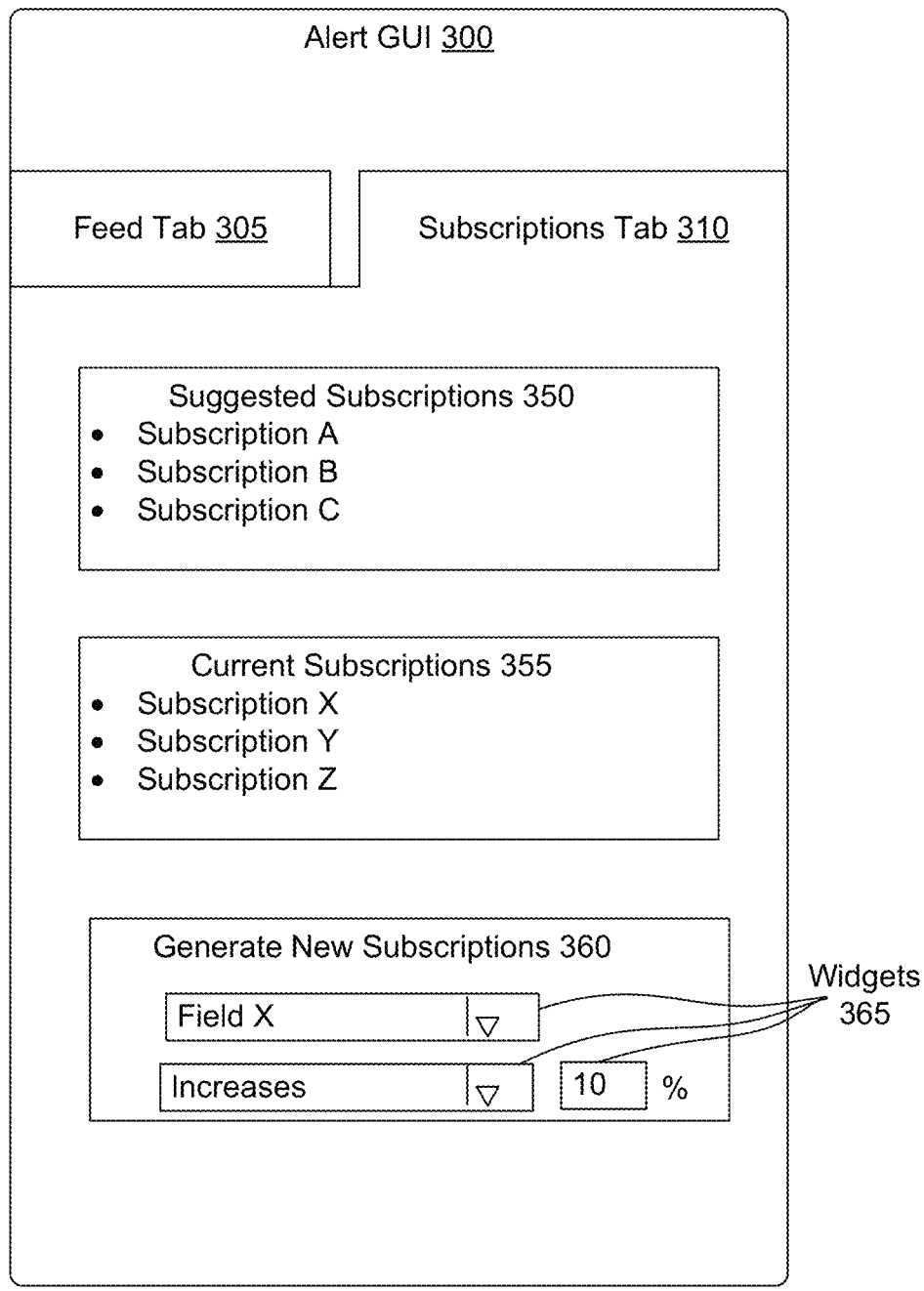

The subscriptions component enables the user to manage (e.g., generate, view, and modify) subscriptions. The subscriptions component may display the suggested subscriptions for the user. The subscriptions component may display multiple GUI widgets (e.g., radio buttons, drop-down boxes, text boxes, etc.) and the user may generate subscriptions or modify current or suggested subscriptions by manipulating the GUI widgets. This may include specifying one or more criteria for one or more fields, tables, and reports. An example alert GUI with the subscriptions component is shown in FIG. 3B.

In one or more embodiments, if the user changes devices 102 (e.g., desktop PC vs. mobile device), the alert GUI, the alert feed, and/or the suggested and current subscriptions may be retransmitted to the new device 102.

In operation 225, a subscription request is received. The subscription request may be received by the alert and subscription management application 142 from the alert GUI displayed on the user's device 102. The subscription request is a new or revised subscription for the user. Accordingly, the subscription request specifies one or more criteria associated with a record, field, table, and/or collaborative document (e.g., report). If the criteria is satisfied, an alert will be generated and inserted into the user's alert feed. The new or revised subscription may correspond to one of the suggested subscriptions from operation 210 (i.e., the user has approved one of the suggested subscription). The user's account in the account repository 136 may be updated with the new or revised subscription.

In operation 230, a stream of modification notices are received. Each modification notice may be published by collaborative management application 140 and received by alert and subscription management application 142. As discussed above, the modification notices are generated in response to changes to fields, records, tables, and/or collaborative documents (e.g., reports) in the record repository 134.

When the modification notice is associated with a field of a record, the modification notice may identify a change to the field. The modification notice may include the name of the field (e.g., "Total Cost"), the previous value of the field (e.g., $50000), the revised value of the field (e.g., $45000), and/or an identifier for the record or a link (e.g., URL) to an expanded view of the record that has the changed field. Additionally or alternatively, the modification notice may include a statement with the change (e.g., "the total cost has decreased from $50000 to $45000"). Further, the modification notice may include a subset of fields from the record with the changed field.

When the modification notice is associated with a report, the modification notice may identify a change to a portion (e.g., sentence, paragraph, chapter, etc.) of a report. The modification notice may include the previous value of the portion (e.g., "The stock market crashed in 1930") and the new value of the portion (e.g., "The stock market crashed in 1929") and/or an identifier for the report or a link (e.g., URL) to the report that has the changed portion. Additionally or alternatively, the modification notice may include a statement with the change (e.g., "Paragraph [0025] was modified").

When the modification notice is associated with a database table, the modification notice may include the identity of the table (e.g., "sales account table"), a link to the table, a link to a newly added record to the table, and/or a statement with the change (e.g., "a new record has been added to the sales account table").

In one or more embodiments, each modification notice is compared with the subscriptions for the user. Specifically, the change identified in each modification notice is compared with the criteria of each subscription for the user to determine if the criteria of the subscription are satisfied.

In operation 235, an alert is generated in response to the change identified in a modification notice satisfying the one or more criteria of a subscription. As discussed above, the criteria may correspond to any change (e.g., any change to a shipping address field or a password field). Alternatively, the criteria may include a change in value by 10% (e.g., for a total cost field). Additionally or alternatively, the criteria may correspond to a change of 30 days or six months (e.g., for a date field). When the modification notice is associated with a field, generating the alert may include extracting, from the modification notice, the name of the field, the previous value of the field, the revised value of the field, the statement with the change, other fields from the same record as the changed field, and/or an identifier for the record or a link (e.g., URL) to an expanded view of record that has the changed field. These extracted items may be included in the alert and the alert may be inserted into the alert feed for the user.

When the modification notice is associated with a report, generating the alert may include extracting, from the modification notice, the previous value of the portion, the new value of the portion, the statement with the change, and/or an identifier for the report or a link (e.g., URL) to the report. These extracted items may be included in the alert and the alert may be inserted into the alert feed for the user.

When the modification notice is associated with a table, generating the alert may include extracting, from the modification notice, the identity of the table (e.g., "sales account table"), a link to the table, a link to a newly added record to the table, and/or a statement with the change (e.g., "a new record has been added to the sales account table"). These extracted items may be included in the alert and the alert may be inserted into the alert feed for the user.

In one or more embodiments, if the user is viewing the alert GUI when the alert is generated, only the newly generated alert is transmitted to the user's device for insertion into the alert feed displayed within the alert GUI. Additionally or alternatively, the entire alert feed with the newly inserted alert is transmitted to the user's device to replace the now-outdated alert feed being displayed within the alert GUI. The alert feed with the newly inserted alert may also be stored in the user's account in account repository 136.

Figure 4:
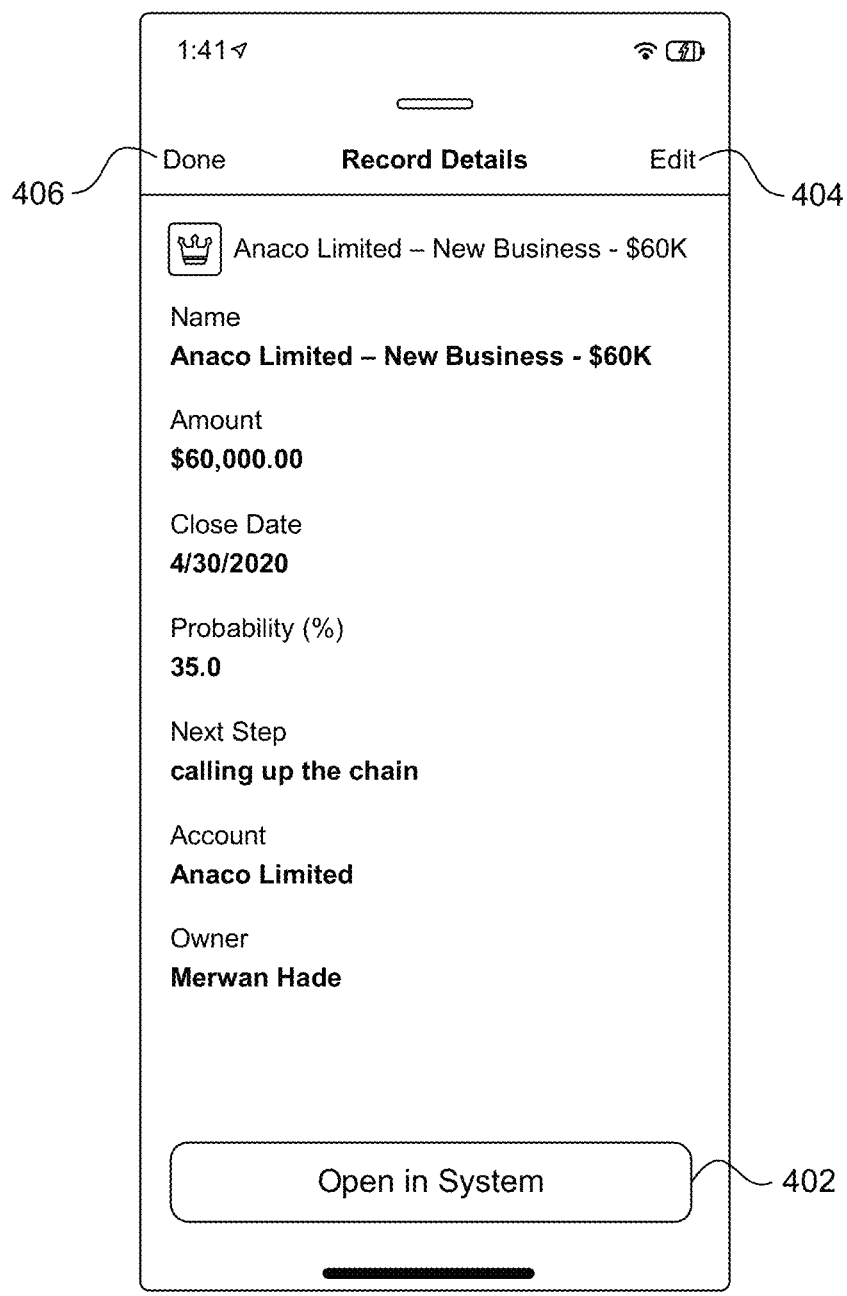
FIG. 4 illustrates an expanded view of a record in accordance with one or more embodiments.

In operation 240, a request for an expanded view of a record is received. The request for the expanded view of the record may be received by the collaborative management application 140 from the alert GUI. Additionally or alternatively, the request may be received by the alert and subscription management application 142 and relayed to the collaborative management application 140. As discussed above, an alert may include a link (e.g., URL) to an expanded view of the record. The link may be visible in the alert displayed within the alert GUI. The request for the expanded view of the record may be triggered by the user invoking (e.g., selecting with a mouse) the link in the alert displayed in the alert GUI. In response, the expanded view of the record may be retrieved from the records repository 134 and transmitted to the user device 102. An example of an expanded view of a record is shown in FIG. 4.

Additionally or alternatively, when the alert corresponds to a changed report, the alert may include a link to the report. This link may be visible in the alert displayed within the alert GUI. The user may obtain the report by invoking the link.

Additionally or alternatively, when the alert correspond to a changed table, the alert may include a link to the able and/or a link to a newly added record in the table. This link may be visible in the alert displayed within the alert GUI. The user may obtain the table or newly added record by invoking the link.

In operation 245, a request to publish a message based on an alert is received from the alert GUI. This is effectively a request to share the alert with another user. Specifically, the alert GUI may have a share feature that enables the user to generate a message including the alert itself and/or the contents of the alert and publish the message to a new or existing chat session with one or more other users of system 100. The message may also include comments, images, and/or animations from the user (e.g., "What happened?! This price change is extreme!"). The request to publish the message may be triggered by the user invoking a share feature within the alert GUI. In response to the request, the cloud collaborative system 170 may publish the message in the requested chat session.

FIG. 3A and FIG. 3B illustrate an alert GUI 300 in accordance with one or more embodiments. Alert GUI 300 may correspond to the alert GUI disclosed above in reference to FIG. 2. Accordingly, alert GUI 300 is displayed on a user device 102. As shown in FIG. 3A, alert GUI 300 has a feed tab 305 and a subscriptions tab 310. In FIG. 3A, the contents of feed tab 305 are shown while the contents of subscriptions tab 310 are hidden. Feed tab 305 includes an alert feed 315 for the user. The alert feed includes multiple alerts (e.g., alert A 320A, alert B 320B) for the user. As discussed above, each alert 320 results from a comparison of a modification notice with a subscription for the user, where the change identified within the modification notice satisfies the one or more criteria of the subscription.

Alert A 320A was generated because a closing date changed. The closing date is a field of a record. Alert A 320A includes a statement with the change (i.e., "Closing date changed from 07/01/2030 to 08/01/2030"). Alert A 320A also includes other fields from the record including the company field (i.e., "A LTD"), the amount field (i.e., "$32,000"), and the revised closing date field ("08/01/2030"). These fields and the statement may have been extracted from the modification notice identifying the change. Alert A 320A also includes a record link. By invoking (e.g., clicking on) the record link, an expanded view of the record may be displayed to the user. This corresponds to operation 240, discussed above in reference to FIG. 2. An example of an expanded view of a record is shown in FIG. 4. The record link in alert A 320A may also be extracted from the modification notice identifying the change.

Alert B 320B was generated because a price changed. The price is a field of a record. Alert B 320B includes a statement with the change (i.e., "Price decreased from $50,000 to $45,000"). Alert B 320B also includes other fields from the record including the company field (i.e., "B LTD"), the revised price field (i.e., "$45,000"), and a closing date field (i.e., "07/15/2030"). These fields and the statement may have been extracted from the modification notice identifying the change. Alert B 320B also includes a record link. By invoking (e.g., clicking on) the record link, an expanded view of the record may be displayed to the user. This corresponds to operation 240, discussed above in reference to FIG. 2. An example of an expanded view of a record is shown in FIG. 4. The record link in alert B 320B may also be extracted from the modification notice identifying the change.

Still referring to FIG. 3A, each alert 320 includes an options button 330. Upon selection of the options button 330, the option panel 335 is displayed. The option panel 335 includes one or more features that can be executed against an alert 320. For example, the options panel 335 includes the share alert feature 340. Invoking (e.g., clicking on) the share alert feature 340 enables the user to publish a message based on the alert in a new or existing chat session with other members. This corresponds to operation 245, discussed above in reference to FIG. 2.

In FIG. 3B, the contents of subscriptions tab 310 are shown while the contents of feed tab 305 are hidden. Subscriptions tab 310 shows the user's current subscriptions 355. Subscriptions tab 310 also displays suggested subscriptions 350 for the user. These suggested subscriptions 350 are generated in operation 210, discussed above in reference to FIG. 2. By selecting one or more of the suggested subscriptions 350, the selected suggested subscription becomes a current subscription for the user. In other words, an alert will be generated for the user's alert feed when a modification notice identifies a change satisfying the one or more criteria of the suggested subscription.

Subscriptions Tab 310 also includes a panel 360 for generating new subscriptions or modifying current subscriptions. As shown in FIG. 3B, the panel has multiple GUI widgets 365 (e.g., drop-down boxes, text boxes, radio buttons) that enable the user to specify the one or more criteria for a new or revised subscription. This corresponds to operation 225, discussed above in reference to FIG. 2. For example, in FIG. 3B, the widgets 365 are being used to specify a criterion of a 10% increase in field X. This will be the criterion in the newly generated subscription for the user. Those skilled in the art will appreciate that the widgets 365 in FIG. 3B are a non-limiting example. Any number of widgets may be used to generate subscriptions for any level of granularity (e.g., any change to a database table vs. a +2.358% change to one specific field of one record).

Figure 3C:
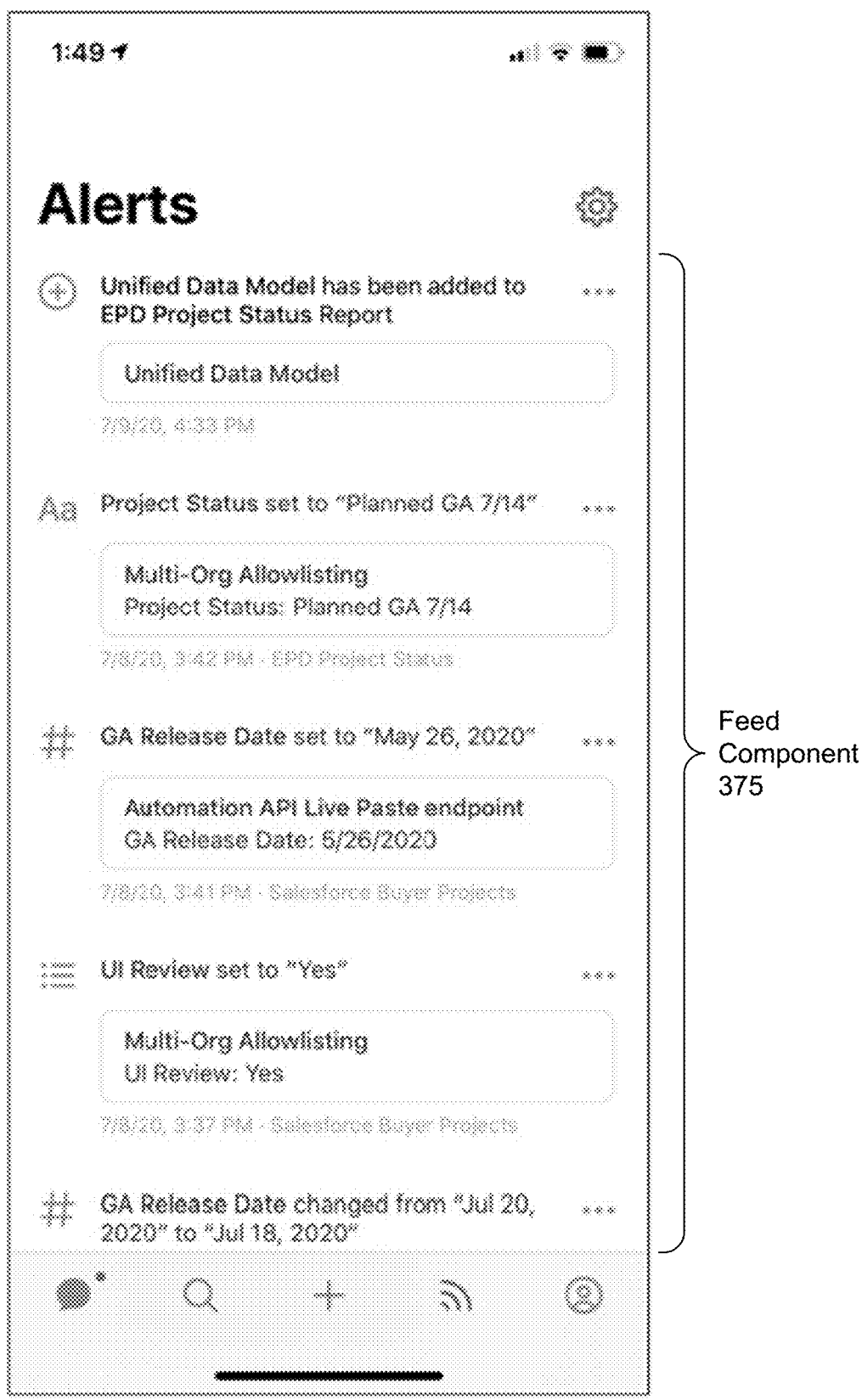
Figure 3D:
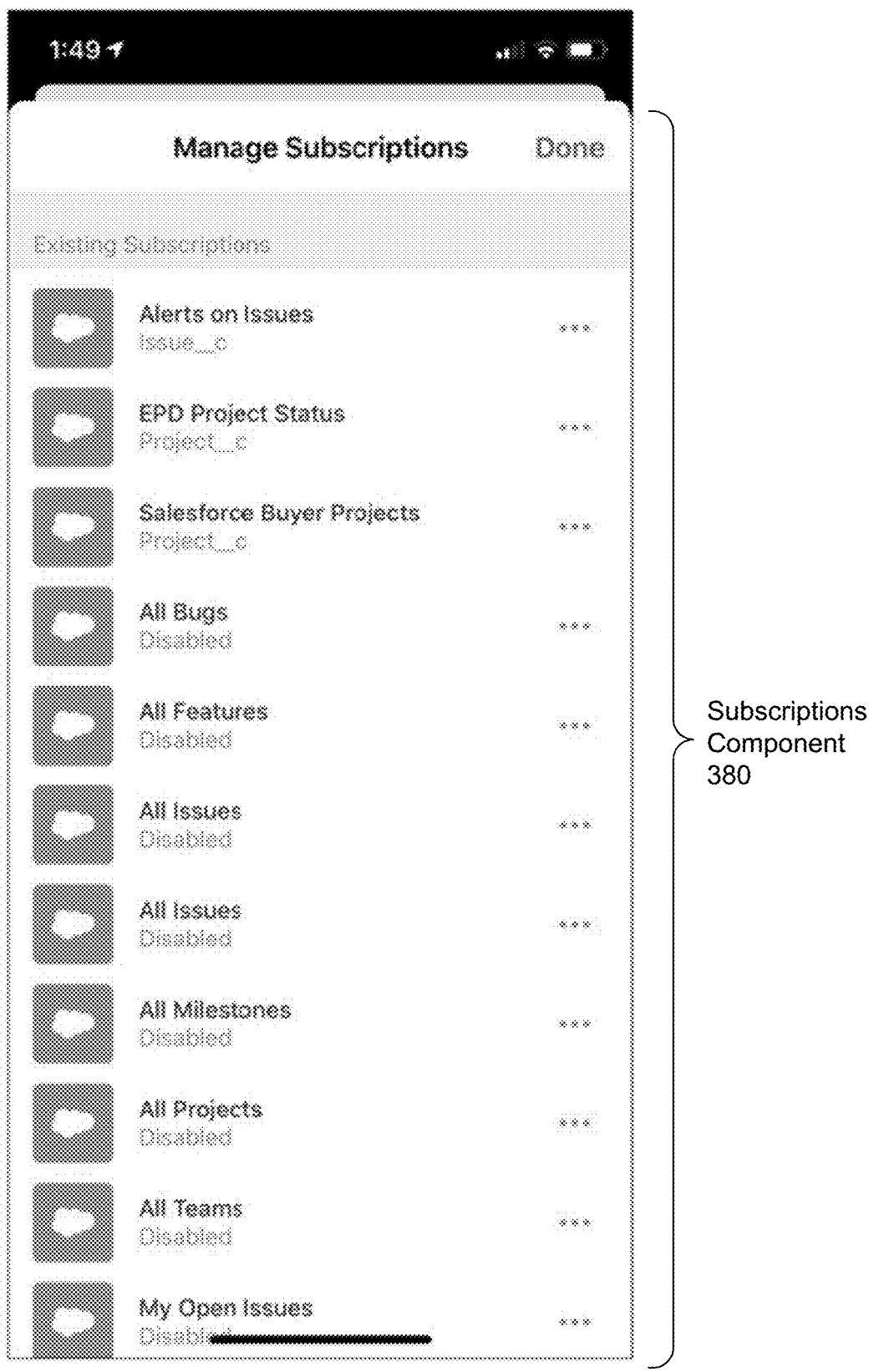
Figure 3E:
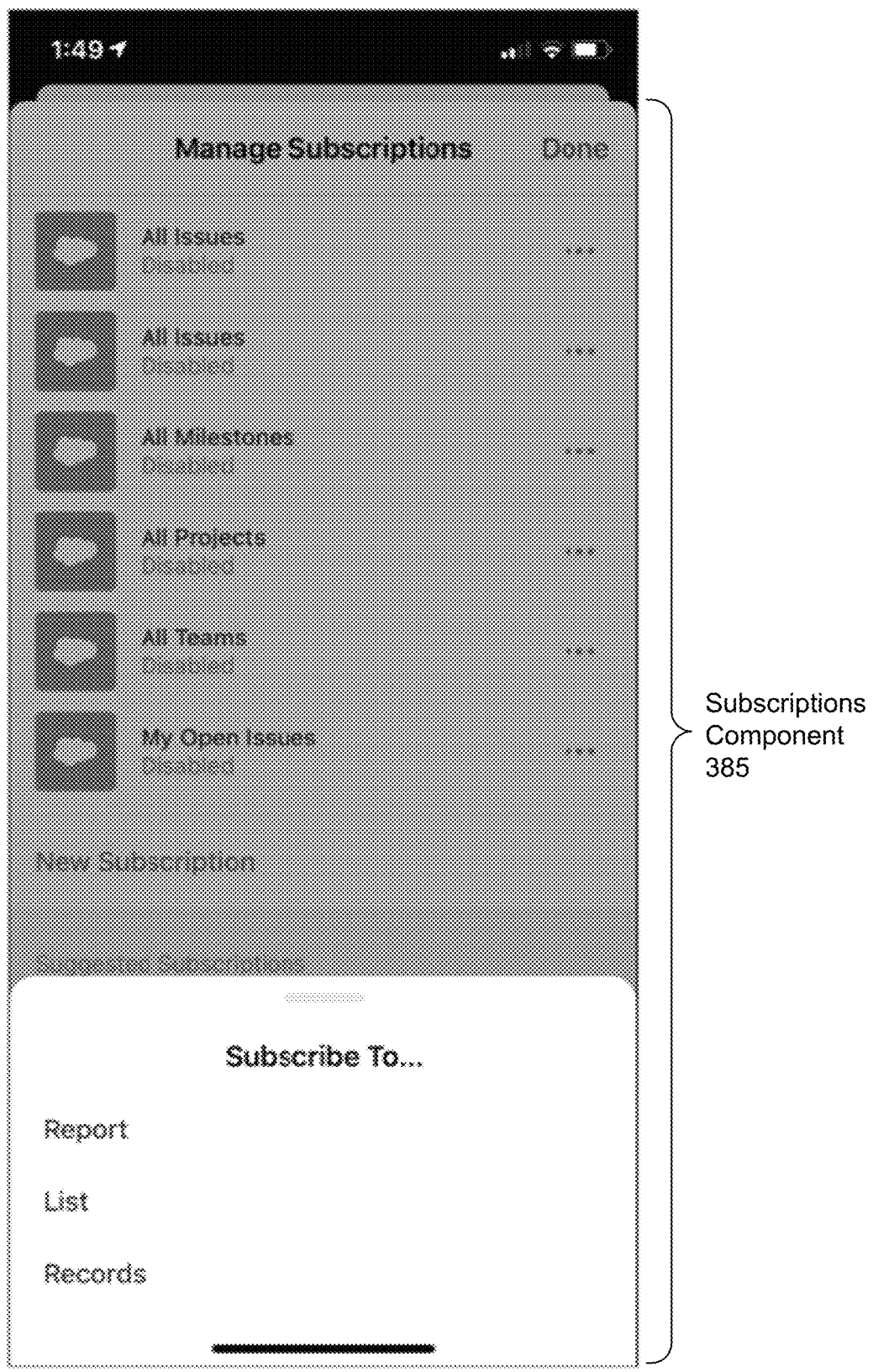
Figure 3F:
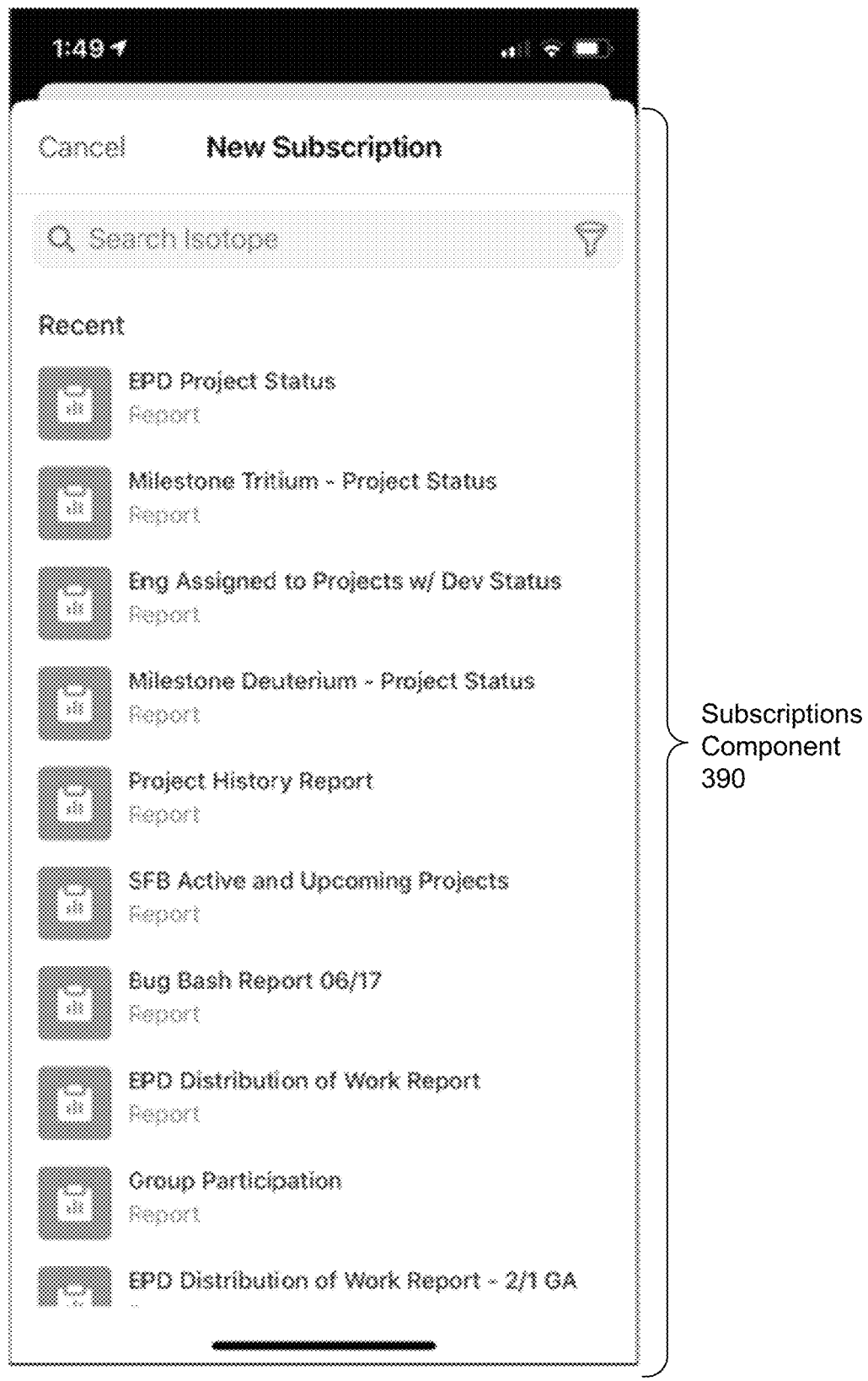

FIG. 3C, FIG. 3D, FIG. 3E, and FIG. 3F illustrate additional examples of the alert GUI. Specifically, FIG. 3C shows an example feed component 375, while FIG. 3D shows an example subscriptions component 380, FIG. 3E shows an example subscriptions component 385, and FIG. 3F shows an example subscriptions component 390. In one or more embodiments, the feed component and the subscriptions component are on different screens/windows. In one or more embodiments, the feed component or the subscriptions component is multiple screens/windows.

FIG. 4 illustrates an expanded view 400 of a record in accordance with one or more embodiments. As discussed above in reference to operation 240, a user may request the expanded view 400 from a link in an alert associated with the record. The expanded view 400 may include additional fields of the record not included in the alert. The expanded view 400 may also include button 402. Button 402 may be selected to view the database record in the backend system.

A user may edit the fields of the database record by selecting edit 404. In response to selecting edit 404, the mobile collaborative application (or desktop collaborative application) may transmit a request to the alert and subscription system. The request may include the identifier of the user who selected edit 404. The alert and subscription system may forward the request to the collaborative management system. Collaborative management application may retrieve the permission settings of the user using the identifier. The permissions settings may indicate which fields of the database record the user may edit. The fields that the user is allowed to edit may become editable for the user in the expanded view 400. The user's edits may be stored in the records repository. The user may return to the alert GUI in response to selecting the "Done" selection 406.

Figure 5:
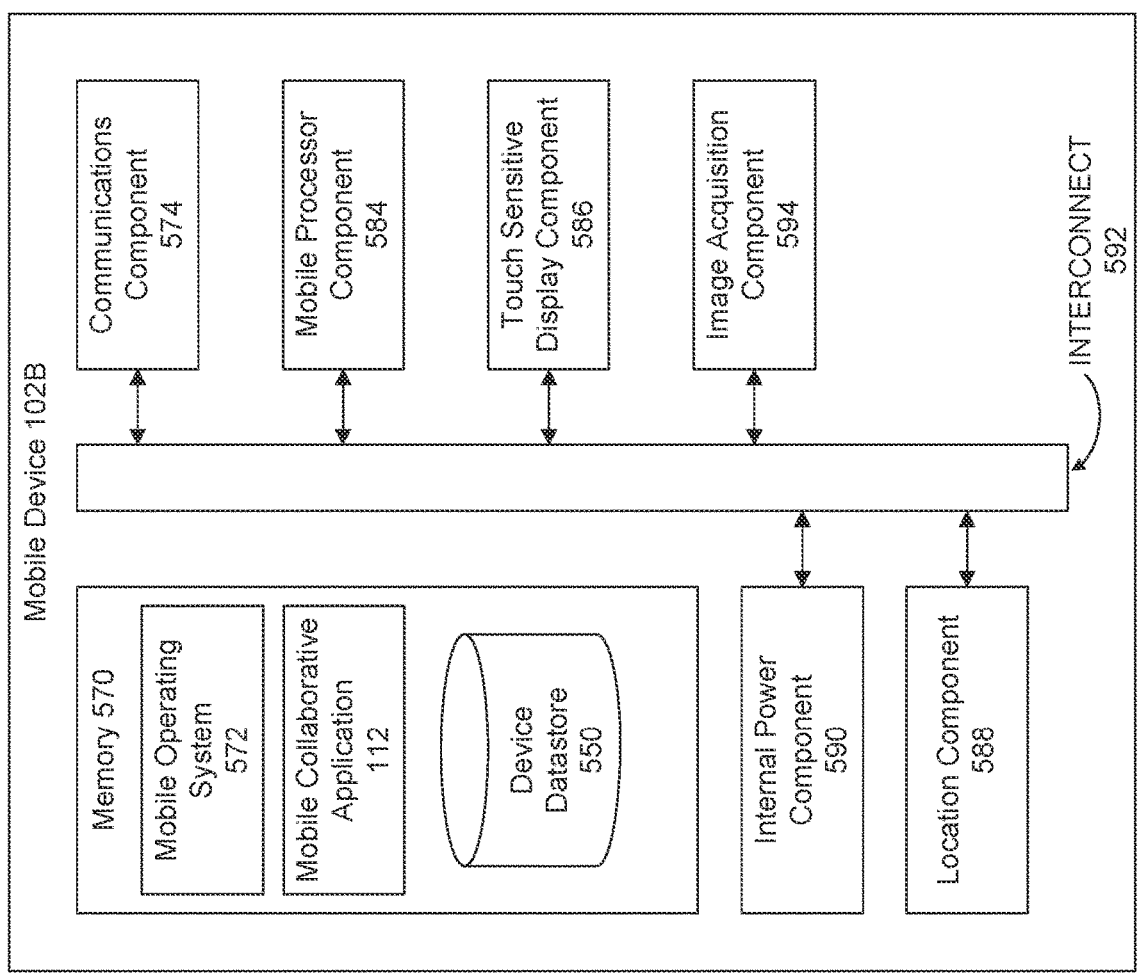
FIG. 5 is a block diagram of example components of a mobile device according to one or more embodiments.

FIG. 5 illustrates an example block diagram 500 of an example embodiment of the mobile device 102B executing a mobile collaborative application 112. The mobile device 102B (e.g., a mobile phone, tablet, laptop, etc.) may be generally configured to enable or allow a user to access various collaborative content and engage in real-time instant messaging of one or more target users. It is to be appreciated that while FIG. 5 illustrates one example embodiment of the mobile device 102B, the example embodiment is not limited to this context.

In one embodiment, the mobile device 102B may be generally arranged to provide mobile computing and/or mobile communications and may include, but are not limited to, memory 570, communications component 574, mobile processor component 584, touch sensitive display component 586, location component 588, internal power component 590, and image acquisition component 594, where each of the components and memory 570 may be operatively connected via interconnect 592.

In one embodiment, the memory 570 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In one embodiment, the memory 570 may include instruction information arranged for execution by the mobile processor component 584. In that embodiment, the instruction information may be representative of at least one operating system 572, one or more applications, which may include, but are not limited to, mobile collaborative application 112. In an embodiment, the memory 570 may further include device datastore 550 which may be configured to store information associated with the mobile collaborative application 112 (e.g., alerts, subscriptions, alert feeds, etc.).

In one embodiment, the mobile operating system 572 may include, without limitation, mobile operating systems (e.g., Apple®, iOS®, Google® Android®, Microsoft® Windows Phone®, Microsoft® Windows®, etc.) generally arranged to manage hardware resources (e.g., one or more components of the mobile device 102B, etc.) and/or software resources (e.g., one or more applications of the mobile device 102B, etc.).

In one embodiment, the communications component 574 may be generally arranged to enable the mobile device 102B to communicate, directly and/or indirectly, with various devices and systems (e.g., alert and subscription system 128, etc.). The communications component 574 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In one embodiment, the mobile processor component 584 may be generally arranged to execute instruction information, which may generally including one or more executable and/or interpretable instructions. In an embodiment, the processor component 584 may be a mobile processor component or system-on-chip (SoC) processor component. The processor component 584, may comprise, among other elements, processor circuit, which may further include, but is not limited to, at least one set of electronic circuits arranged to execute one or more instructions. Examples of mobile processor components 584 may include, but is not limited to, Qualcomm® Snapdragon®, NVidia® Tegra®, Intel® Atom®, Samsung® Exynos, Apple® A7®-A13®, or any other type of mobile processor(s) arranged to execute the instruction information including the one or more instructions stored in memory 570.

In one embodiment, the touch sensitive display component 586 may be generally arranged to receive and present visual display information, and provide touch input information based on detected touch based or contact based input. Moreover, the touch sensitive display component 586 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the display device 568 to detect and/or receive touch or contact based input information associated with the display device of the mobile device 102B. Additionally, the touch sensor(s) may be integrated with the surface of the display device, so that a user's touch or contact input may substantially correspond to the presented visual display information on the display device, such as, for example, one or more user interface (UI) views and elements discussed and illustrated herein.

In one embodiment, the location component 588 may be generally arranged to receive positioning signals representative of positioning information and provide location information (e.g., approximate physical location of the mobile device 102B) determined based at least partially on the received positioning information. Moreover, the location component 588 may include, among other elements, positioning circuit (e.g., a global positioning system (GPS) receiver, etc.) arranged to determine the physical location of the mobile device 102B. In some embodiments, the location component 588 may be further arranged to communicate and/or interface with the communications component 574 in order to provide greater accuracy and/or faster determination of the location information.

In one embodiment, the internal power component 590 may be generally arranged to provide power to the various components and the memory of the mobile device 102B. In one embodiment, the internal power component 590 may include and/or be operatively coupled to an internal and/or external battery configured to provide power to the various components (e.g., communications component 574, motion component 576, memory 570, etc.). The internal power component 590 may also be operatively coupled to an external charger to charge the battery.

In one embodiment, the image acquisition component 594 may be generally arranged to generate a digital image information using an image capture device such as, for example, a charged coupled device (CCD) image sensor (Not shown). Moreover, the image acquisition component 594 may be arranged to provide or otherwise stream digital image information captured by a CCD image sensor to the touch sensitive display component 586 for visual presentation via the interconnect 592, the mobile operating system 572, mobile processor component 584.

Figure 6:
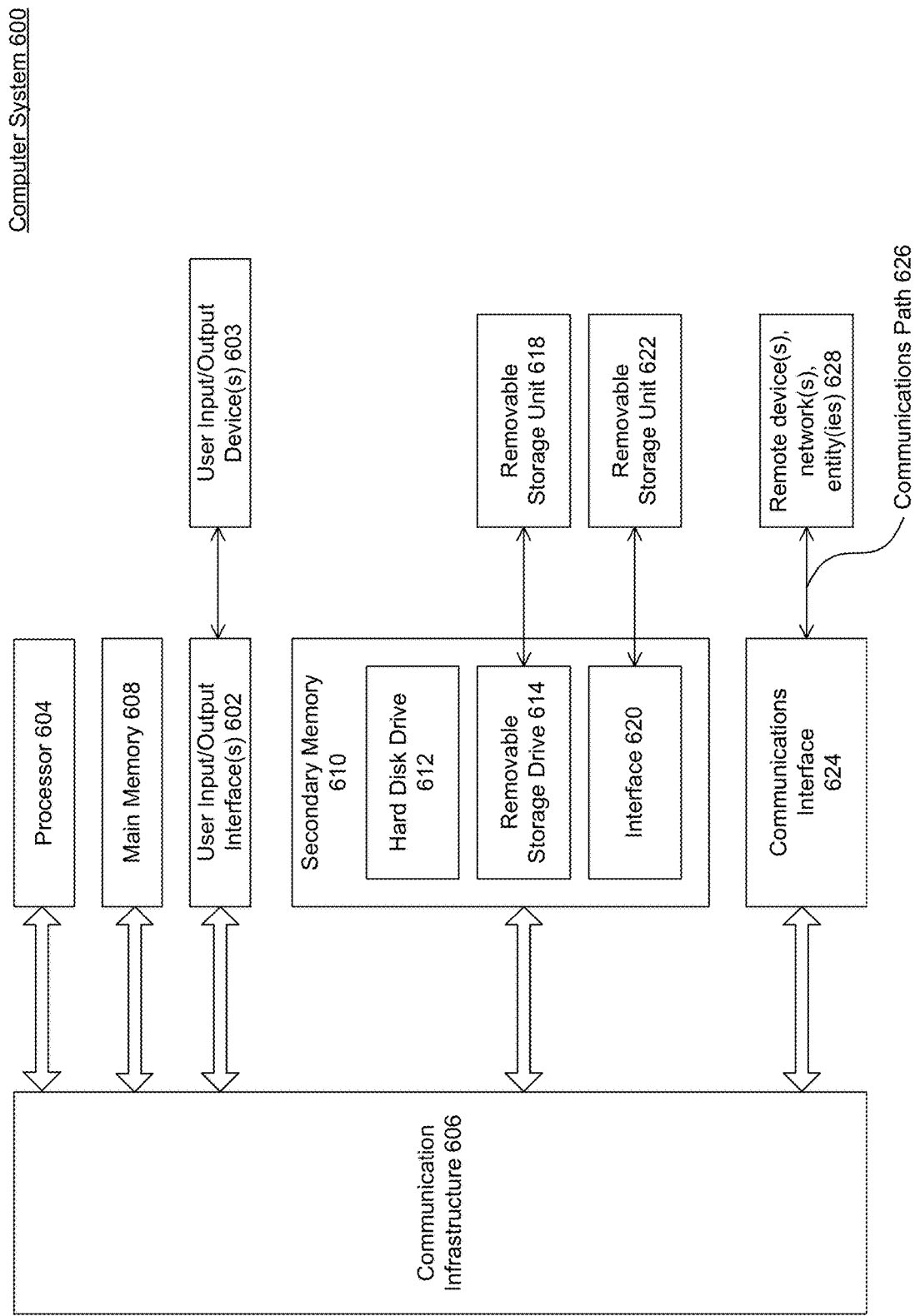
FIG. 6 is a block diagram of example components of a computing system according to one or more embodiments.

FIG. 6 illustrates an example computer system 600 useful for implementing various embodiments. Moreover, various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof. For example, the computer system 600 may implement the one or more computing devices 102A. In another example, one or more computing systems 600 may be communicatively coupled to each other, where each is configured to execute one or more virtual machines (not shown). The one or more virtual machines may be managed or otherwise orchestrated by one or more virtual machine managers (not shown) configured to provision and/or configure one or more virtual machines to the one or more computing systems 600. The one or more virtual machines may be further configured as a Software as a Service (SaaS), Platform as a Service (PaaS) and/or an Infrastructure as a Service (IaaS) provider configured to host or otherwise execute one or more applications associated with one or more gateways, systems, and/or repositories of FIG. 1.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method, comprising:
    generating, by one or more processors, a first subscription based on a frequently viewed field accessed by a first user in a collaborative document stored in a cloud collaborative environment, wherein the first subscription specifies a criterion of a change to the frequently viewed field within the collaborative document, and wherein users of the cloud collaborative environment have permissions to collaboratively change the frequently viewed field within the collaborative document from a respective device;
    generating, by the one or more processors, an alert based on a first modification notice identifying a change to a first field of the collaborative document, wherein a second user of the cloud collaborative environment changes the collaborative document and the change satisfies a criterion specified in the first subscription for the first user of the cloud collaborative environment; and
    inserting, by the one or more processors, the alert in an alert feed configured in an alert graphical user interface (GUI) to display a plurality of alerts for the first user of the cloud collaborative environment.

2. The method of claim 1, wherein:
    the first modification notice comprises a subset of fields of the collaborative document including the first field,
    the alert comprises the subset of fields extracted from the first modification notice,
    the subset of fields are visible in the alert in the alert feed.

3. The method of claim 2, wherein first modification notice further comprises a statement with the change, and wherein the statement is visible in the alert in the alert feed.

4. The method of claim 2, further comprising:
    receiving, by the one or more processors, a request for an expanded view of the collaborative document from the first device,
    wherein the first modification notice further comprises a link to the expanded view of the collaborative document,
    wherein the first alert further comprises the link to the expanded view of the collaborative document extracted from the first modification notice, and
    wherein the request for the expanded view is triggered by the first user invoking the link from within the alert GUI.

5. The method of claim 2, further comprising:
    receiving, by the one or more processors, a request to publish a message based on the alert,
    wherein the request to publish the message is triggered by the first user invoking a share feature within the alert GUI.

6. The method of claim 1, further comprising:
    determining, by the one or more processors, a frequently viewed column in a plurality of collaborative documents; and
    generating, by the one or more processors, a suggested subscription for a second field corresponding to the frequently viewed column,
    wherein the alert GUI comprises a subscriptions component configured to display the suggested subscription to the first user.

7. The method of claim 1, further comprising:
    receiving, by the one or more processors, a second modification notice identifying a change to the collaborative document;
    comparing, by the one or more processors, the change to the collaborative document with a criterion specified in a second subscription for the first user;
    in response to the change to the collaborative document satisfying the criterion specified in the second subscription, generating, by the one or more processors, an additional alert based on the change to the collaborative document for display in the alert feed comprising the plurality of alerts for the first user.

8. The method of claim 1, further comprising:
    storing the alert feed in an alert repository;
    determining, by the one or more processors, the first user is operating a second device; and
    in response to determining the user is operating the second device:
        retrieving the alert feed from the alert repository; and
        transmitting the alert GUI and the alert feed to the second device.

9. A system, comprising:

a memory; and at least one processor coupled to the memory and configured to:

generate a first subscription based on a frequently viewed field accessed by a first user in a collaborative document stored in a cloud collaborative environment, wherein the first subscription specifies a criterion of a change to the frequently viewed field within the collaborative document, wherein users of the cloud collaborative environment have permissions to collaboratively change the frequently viewed field within the collaborative document from a respective device;

generate an alert based on a first modification notice identifying a change to a first field of the collaborative document, wherein a second user of the cloud collaborative environment changes the collaborative document and the change satisfies a criterion specified in the first subscription for the first user of the cloud collaborative environment; and insert the alert in an alert feed configured in an alert graphical user interface (GUI) to display a plurality of alerts for the first user.

10. The system of claim 9, wherein:

the first modification notice comprises a subset of fields of the collaborative document including the first field, the alert comprises the subset of fields extracted from the first modification notice, the subset of fields are visible in the alert in the alert feed.

11. The system of claim 10, wherein first modification notice further comprises a statement with the change, and wherein the statement is visible in the alert in the alert feed.

12. The system of claim 10, wherein the at least one processor is further configured to:

receive, a request for an expanded view of the collaborative document record from the device, wherein the first modification notice further comprises a link to the expanded view of the collaborative document, wherein the alert further comprises the link to the expanded view of the collaborative document extracted from the first modification notice, and wherein the request for the expanded view is triggered by the first user invoking the link from within the alert GUI.

13. The system of claim 10, wherein the at least one processor is further configured to:

receive a request to publish a message based on the alert, wherein the request to publish the message is triggered by the first user invoking a share feature within the alert GUI.

14. The system of claim 9, wherein the at least one processor is further configured to:

determine a frequently viewed column in a plurality of collaborative documents; and generate a suggested subscription for a second field corresponding to the frequently viewed column, wherein the alert GUI comprises a subscriptions component configured to display the suggested subscription.

15. The system of claim 9, wherein the at least one processor is further configured to:

receive a second modification notice identifying a change to a collaborative document;

compare the change to the collaborative document with a criterion specified in a second subscription for the first user;

in response to the change to the collaborative document satisfying the criterion specified in the second subscription, generate an additional alert based on the change to the collaborative document for display in the alert feed comprising the plurality of alerts for the first user.

16. A non-transitory computer readable medium (CRM) having instructions stored thereon that, when executed by at least one computing device, cause the at least one computing device to perform operations comprising:

generating a first subscription based on a frequently viewed field accessed by a first user in a collaborative document stored in a cloud collaborative environment, wherein the first subscription specifies a criterion of a change to the frequently viewed field within the collaborative document, and wherein users of the cloud collaborative environment have permissions to collaboratively change the frequently viewed field within the collaborative document from a respective device;

generating an alert based on a first modification notice identifying a change to a first field of the collaborative document, wherein a second user of the cloud collaborative environment changes the collaborative document and the change satisfies criterion specified in the first subscription for the first user of the cloud collaborative environment;

inserting the alert in an alert feed configured in an alert graphical user interface (GUI) to display a plurality of alerts for the first user.

17. The non-transitory CRM of claim 16, wherein:

the first modification notice comprises a subset of fields of the collaborative document including the first field, the alert comprises the subset of fields extracted from the first modification notice, and the subset of fields are visible in the alert in the alert feed.

18. The non-transitory CRM of claim 17, the operations further comprising:

receiving a request for an expanded view of the collaborative document from the device, wherein the first modification notice further comprises a link to the expanded view of the collaborative document, wherein the alert further comprises the link to the expanded view of the collaborative document extracted from the first modification notice, and wherein the request for the expanded view is triggered by the first user invoking the link from within the alert GUI.

19. The non-transitory CRM of claim 17, the operations further comprising:

receiving a request to publish a message based on the alert, wherein the request to publish the message is triggered by the first user invoking a share feature within the alert GUI.

20. The non-transitory CRM of claim 16, the operations further comprising:

determining a frequently viewed column in a plurality of collaborative documents; and generating a suggested subscription for a second field corresponding to the frequently viewed column, wherein the alert GUI comprises a subscriptions component configured to display the suggested subscription to the first user.

* * * * *

UNITED STATES PATENT AND TRADEMARK OFFICE
CERTIFICATE OF CORRECTION

PATENT NO. : 11,954,088 B2
APPLICATION NO. : 17/162433
DATED : April 9, 2024
INVENTOR(S) : Botwick et al.

Page 1 of 1

It is certified that error appears in the above-identified patent and that said Letters Patent is hereby corrected as shown below:

In the Claims

In Column 16, Claim 4, Line 24, after "wherein the", delete "first".

In Column 17, Claim 12, Line 37, after "document", delete "record".

Signed and Sealed this
Eighteenth Day of June, 2024

Katherine Kelly Vidal
*Director of the United States Patent and Trademark Office*